(12) United States Patent
Shyu et al.

(10) Patent No.: US 7,763,844 B2
(45) Date of Patent: Jul. 27, 2010

(54) CCD SCANNER CAPABLE OF SCANNING AT AN ARBITRARY ANGLE WITH ELASTIC SWINGING LOCKING BAR ATTACHED TO CHASSIS

(75) Inventors: Devon Shyu, Tainan Hsien (TW); John Mai, Hsin-Chu (TW)

(73) Assignee: Avision Inc. (TW)

( * ) Notice: Subject to any disclaimer, the term of this patent is extended or adjusted under 35 U.S.C. 154(b) by 2654 days.

(21) Appl. No.: 09/821,135

(22) Filed: Mar. 30, 2001

(65) Prior Publication Data

US 2002/0088935 A1 Jul. 11, 2002

(30) Foreign Application Priority Data

Jan. 10, 2001 (TW) .............................. 90200442 U (51) Int. Cl.
*H01J 5/02* (2006.01)
*H01J 5/116* (2006.01)
*H04N 1/00* (2006.01)

(52) U.S. Cl. ..................... 250/239; 250/234; 358/474

(58) Field of Classification Search ................. 250/234, 250/208.1, 235, 236, 239; 358/474, 482, 358/483
See application file for complete search history.

(56) References Cited

U.S. PATENT DOCUMENTS 6,266,164 B1 * 7/2001 Chiang ....................... 358/474
6,285,483 B1 * 9/2001 Shia et al. ................... 358/474

* cited by examiner

*Primary Examiner*—Georgia Epps
*Assistant Examiner*—Alicia M Harrington
(74) *Attorney, Agent, or Firm*—Charles E. Baxley (57) ABSTRACT

The invention includes at least one swingable elastic locking bar mounted on the chassis of the scanner, and the end of the elastic locking bar is provided with a contact member having a low friction coefficient, and let the contact member on the elastic locking bar contact the top cover of the frame body of the scanner. Thus, the chassis may be rigidly rested on the top cover or on the glass mounted on the top cover to move, thereby providing a good scanning effect of an arbitrary angle. The swingable action of the elastic locking bar may efficiently absorb the tolerance produced during fabrication and assembly of the top cover and the bottom housing of the frame body of the scanner, thereby assuring stability of the optical travel path.

11 Claims, 9 Drawing Sheets

CCD SCANNER CAPABLE OF SCANNING AT AN ARBITRARY ANGLE WITH ELASTIC SWINGING LOCKING BAR ATTACHED TO CHASSIS

BACKGROUND OF THE INVENTION

1. Field of the Invention

The invention relates to a mechanism of a scanner, and more particularly to a CCD scanner capable of scanning at an arbitrary angle.

2. Description of the Related Prior Art

Figure 9:
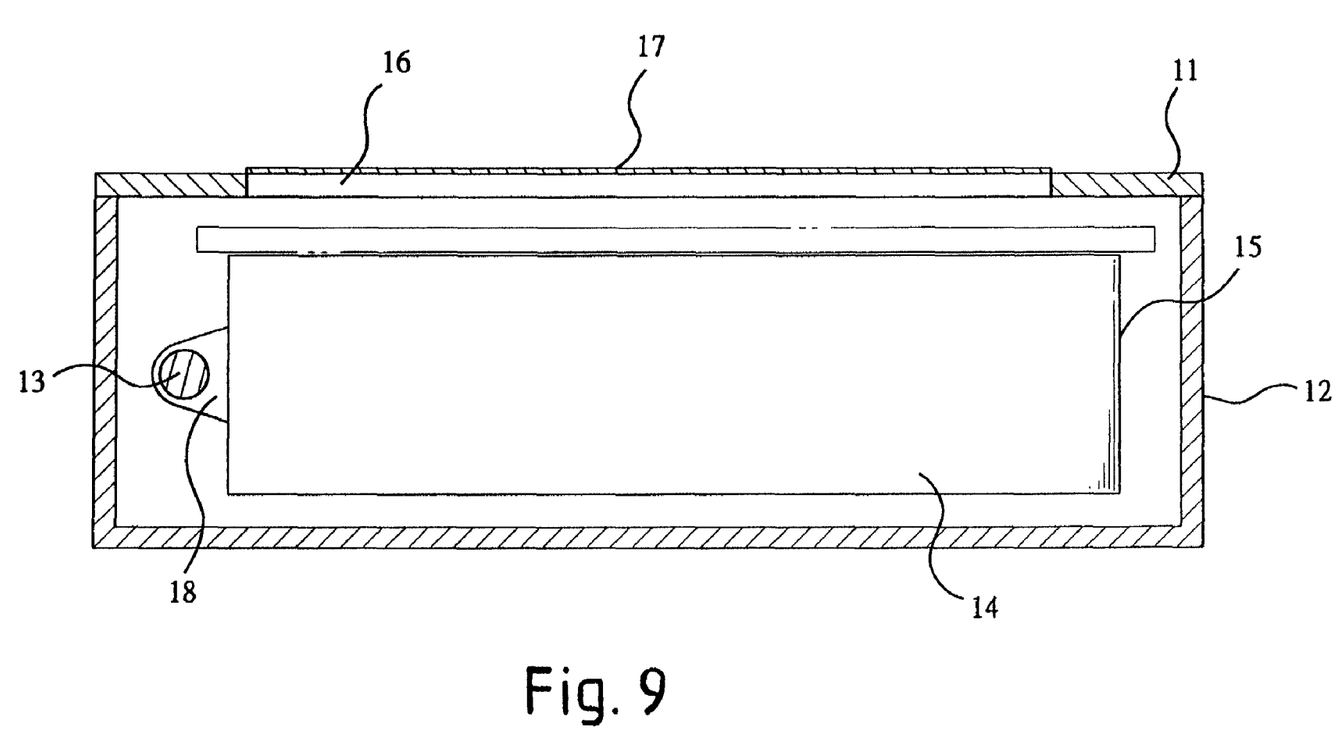
FIG. 9 is a schematic plan view of a conventional scanner.

The scanner is an input equipment which may proceed an image analysis by reflected light from the document or penetrating light from the document. Referring to FIG. 9, a general scanner structure includes a guide rod 13 mounted in a frame body consisting of a top cover 11 and a bottom housing 12. One end of the chassis 14 is provided with a bushing 18 which is fitted with the guide rod 13, thereby forming a positioning state. The other end of the chassis 14 is formed with a free end 15. When scanning the document, the scanner is placed at a horizontal position. The document 17 is placed on the glass 16. The chassis 14 may move stably to proceed scanning the document by its own weight and the support of the guide rod 13.

However, the scanner placed at a horizontal position occupies a predetermined space apparently. If the scanner is not often used, it will be an apparatus which occupies a large space. If the scanner is placed and used in other manner, for example, if the scanner is rested on a vertical wall to be used, or is rotated through 180 degrees to be used, some problems will occur. That is, because one end of the chassis 14 is a free end 15 without a positioning effect, the chassis 14 will deflect and wobble during movement. Thus, the distance between chassis 14 and the document 17 is not fixed, so that the scanning effect is poor.

SUMMARY OF THE INVENTION

The invention is to provide a scanner in which the elastic member presses one end of the chassis, so that the chassis presents a stable assembling effect, and will not produce apparent wobbling during movement at arbitrary angles, thereby achieving the purpose of proceeding scanning at an arbitrary angle.

For achieving the above-mentioned objective, at least one elastic locking bar is mounted on the chassis of the scanner, and the end of the elastic locking bar is provided with a contact member having a low friction coefficient, and let the contact member on the elastic locking bar contact the top cover of the frame body of the scanner. Thus, the chassis may be rigidly rested on the top cover or on the glass mounted on the top cover to move by pressing of the elastic locking bar.

The contact member mounted on the elastic locking bar may be a rolling roller, or may be made of teflon having a low friction coefficient.

The elastic locking bar is mounted on the chassis and may swing. Thus, the swingable action of the elastic locking bar may efficiently absorb the tolerance produced during fabrication and assembly of the top cover and the bottom housing of the frame body of the scanner, thereby assuring stability of the optical travel path.

Further benefits and advantages of the invention will become apparent after a careful reading of the detailed description with appropriate reference to the accompanying drawings.

DETAILED DESCRIPTION OF THE INVENTION

Figure 1:
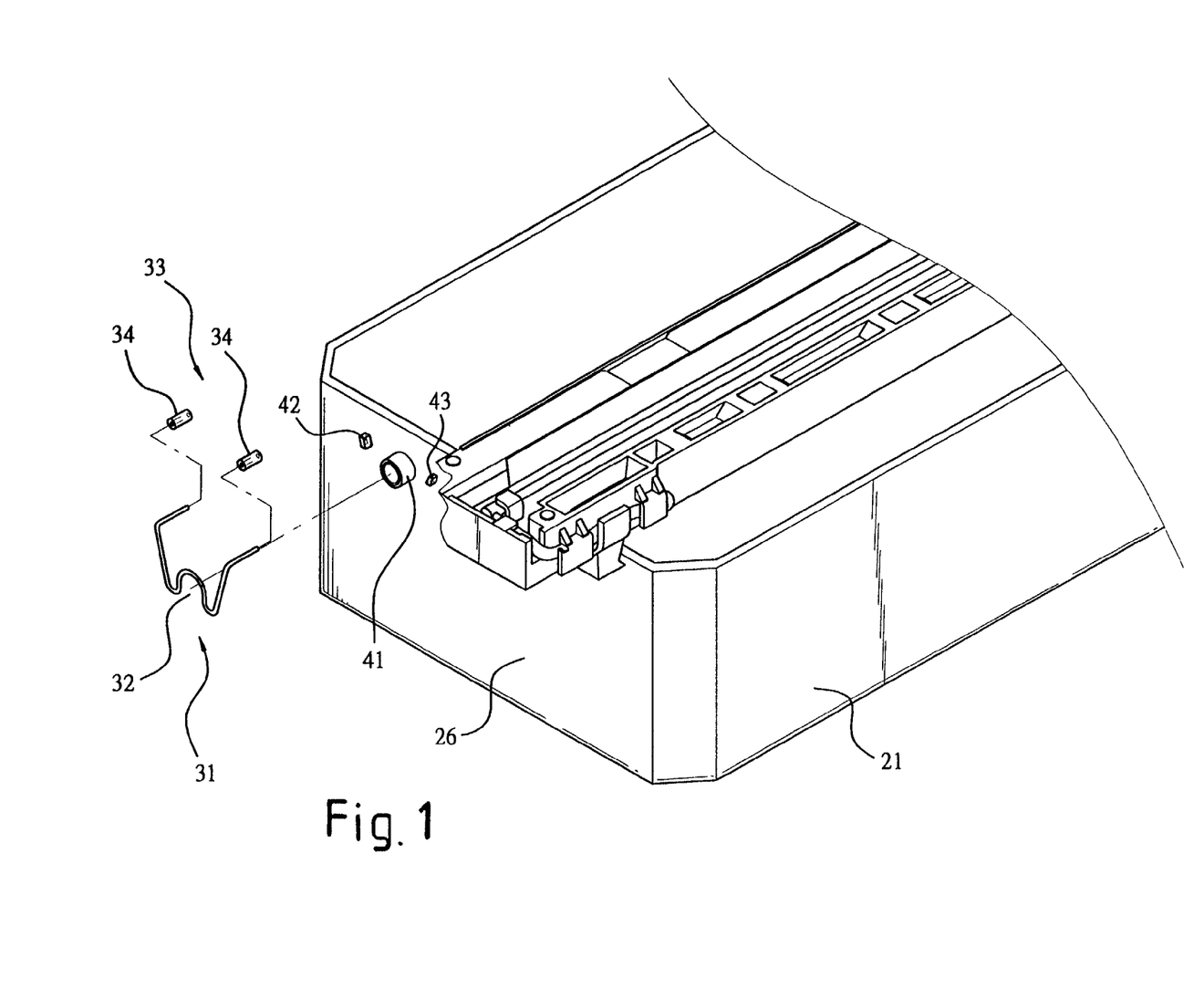
FIG. 1 is an exploded perspective view of one embodiment of the invention.
Figure 3:
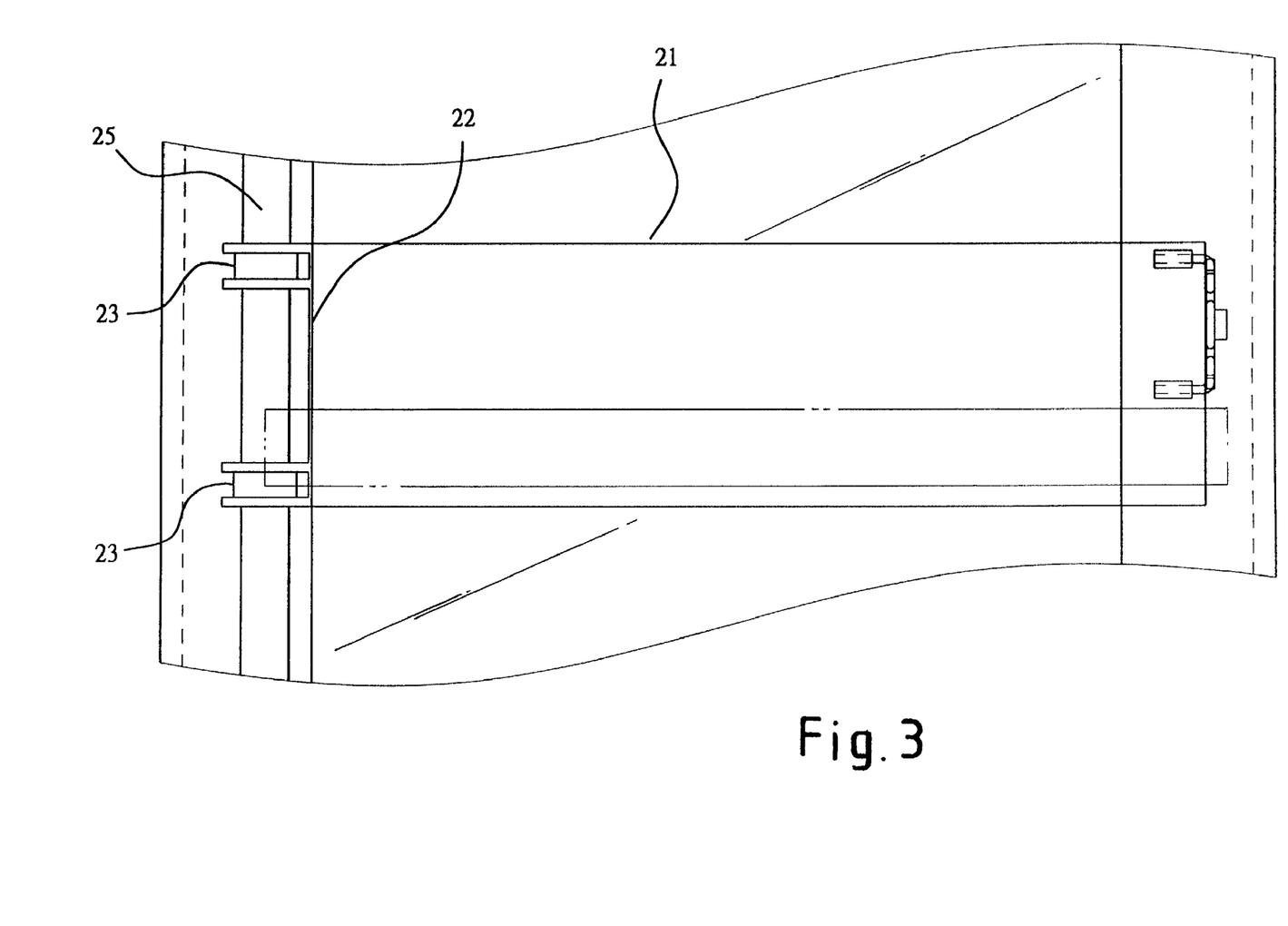
FIG. 3 is a schematic top plan view of the invention.
Figure 4:
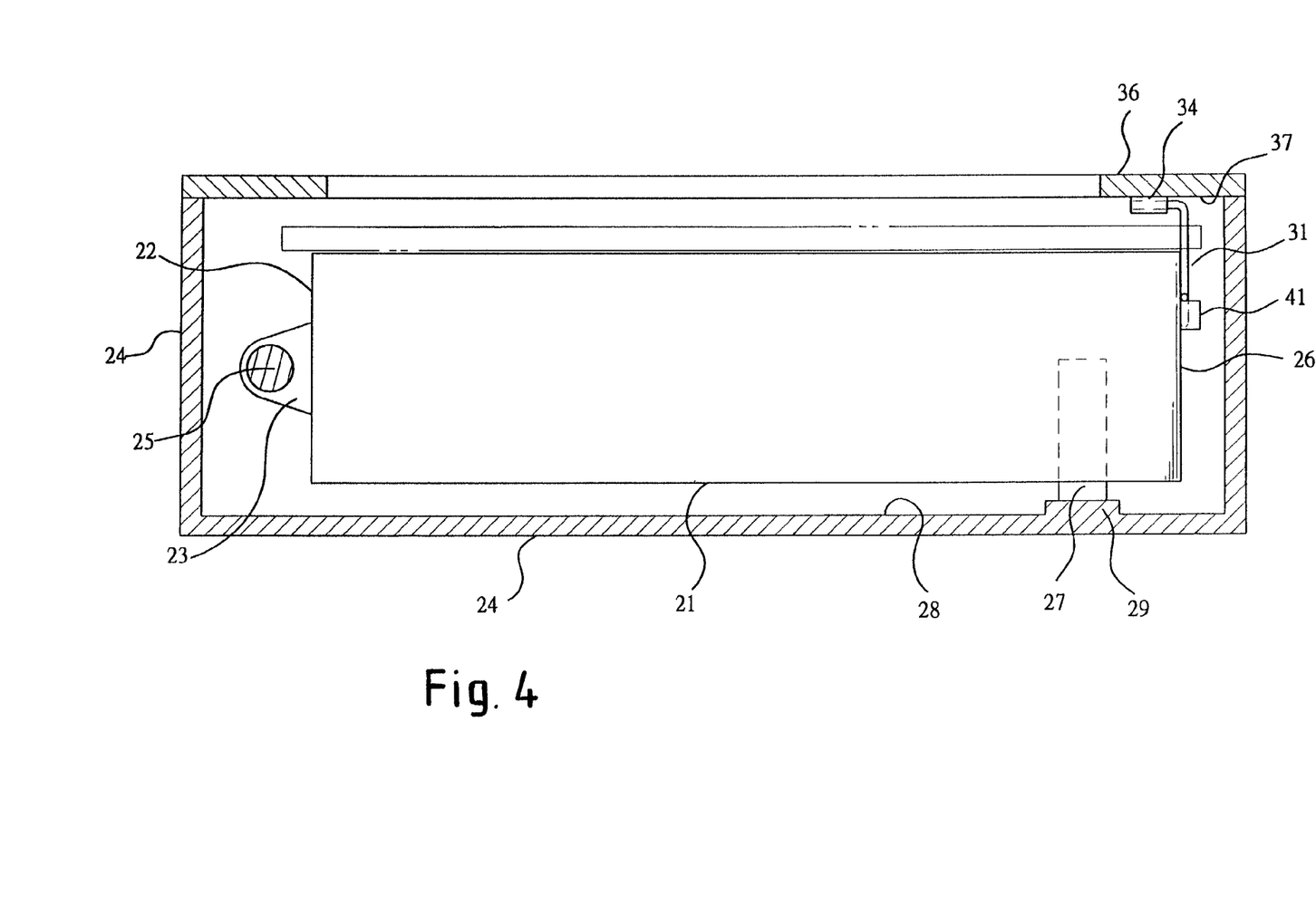
FIG. 4 is a front plan structure schematic view of the invention.

Referring to FIGS. 1, 3 and 4, the scanner of the invention includes at least one elastic locking bar 31 and a chassis 21 in a frame body 20 consisting of a top cover 36 and a bottom housing 24. The first end 22 of the chassis 21 may be provided with at least one bushing 23 (two bushings in this embodiment), and each bushing 23 is combined with a guide rod 25 mounted in the bottom housing 24 of the scanner. The lower portion of the second end 26 of the chassis 21 is provided with a roller 27. The bottom face 28 of the bottom housing 24 of the scanner is provided with a protruding track 29 for supporting the roller 27. Thus, the roller 27 may move along the protruding track 29.

Figure 2:
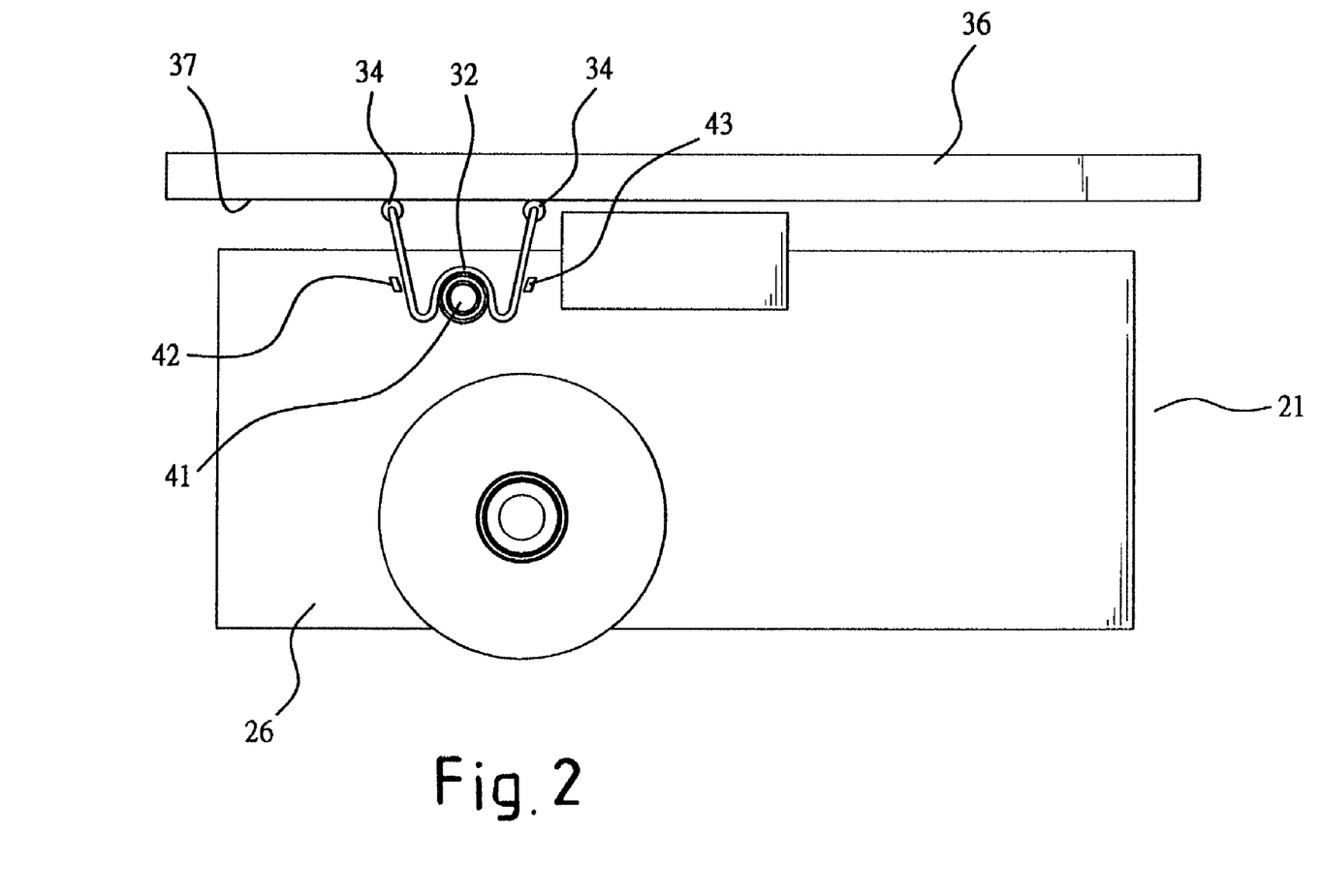
FIG. 2 is a structure schematic view of the invention.
Figure 5:
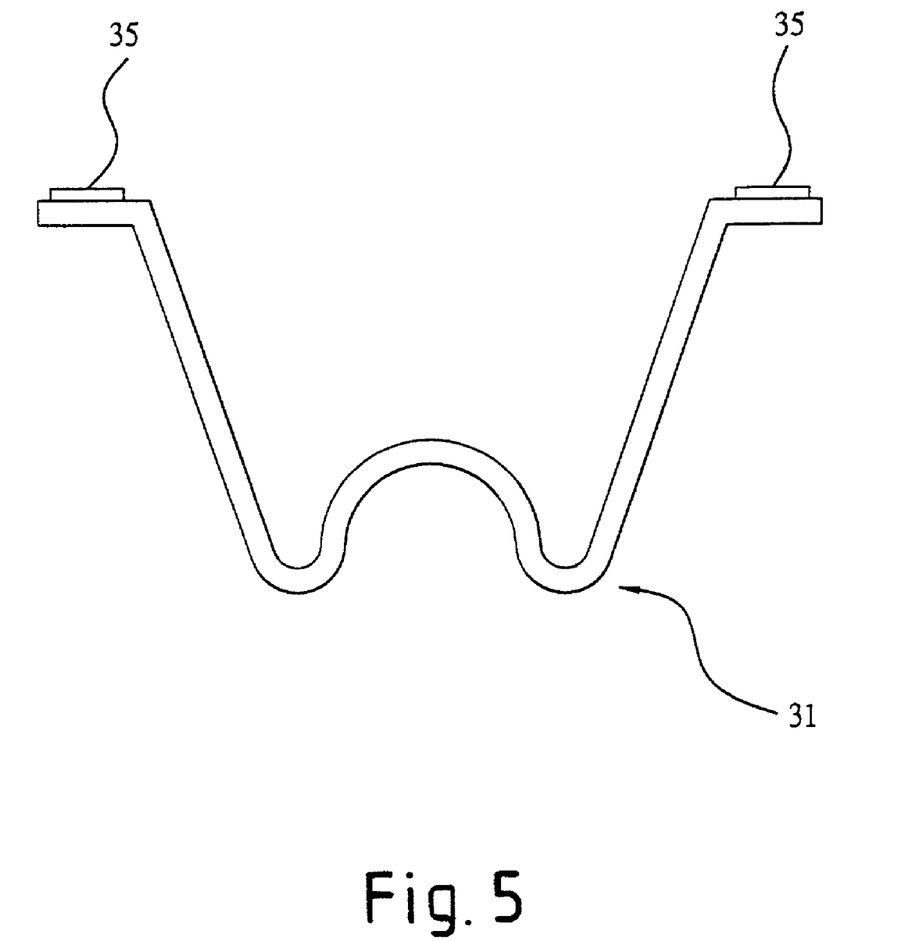
FIG. 5 is a plan view of the elastic locking bar of the invention.

Referring to FIGS. 1, 2 and 4, the second end 26 of the chassis 21 is provided with a protruding shaft 41. The surface of the second end 26 of the chassis 21 is provided with two catch blocks 42 and 43 which are respectively located on the opposite sides of the protruding shaft 41. The elastic locking bar 31 is bent into a W-shape. The concave 32 of the middle of the elastic locking bar 31 is rested on the protruding shaft 41. The two outer sides of the elastic locking bar 31 mate with the two catch blocks 42 and 43. The ends of the two sides of the elastic locking bar 31 are provided with a contact member 33 having a low friction coefficient. The contact member 33 may be a roller 34, or a member 35 made of teflon, as shown in FIG. 5. The elastic locking bar 31 may be made of metal, or PC material, or glass fiber having elasticity.

When the top cover 36 of the frame body 20 is matingly mounted on top of the bottom housing 24, the contact member 33 mounted on the elastic locking bar 31 is in contact with an inner layer surface 37 of the top cover 36. Accordingly, a pressing and limiting force is produced on the second end 26 of the chassis 21. Since the bushing 23 on the first end 22 is fitted with the guide rod 25, the chassis 21 may be disposed at a rigid positioning state. Especially, the second end 26 is no longer a free end.

Figure 6:
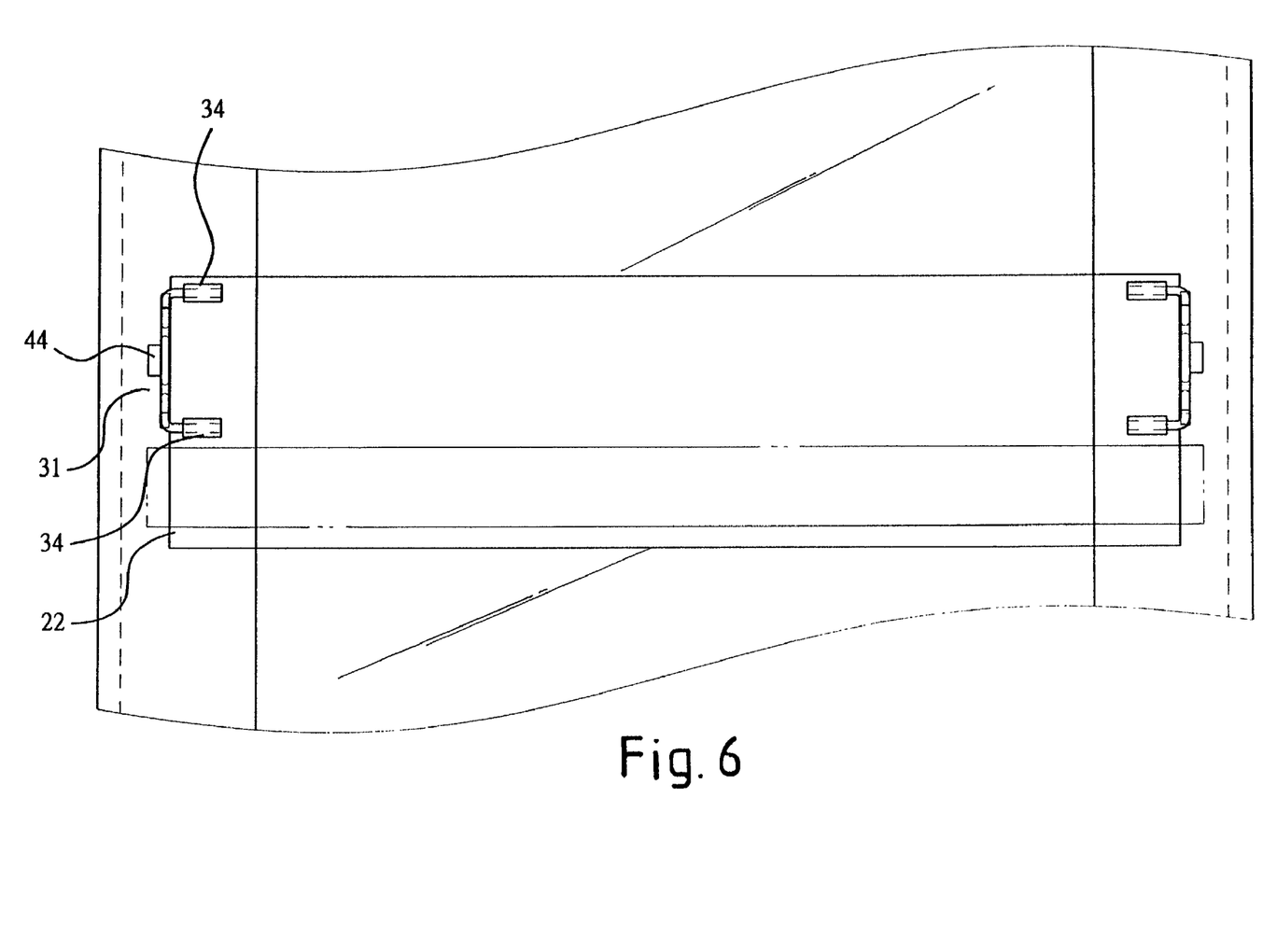
FIG. 6 is a top plan structure schematic view of another embodiment of the invention.
Figure 7:
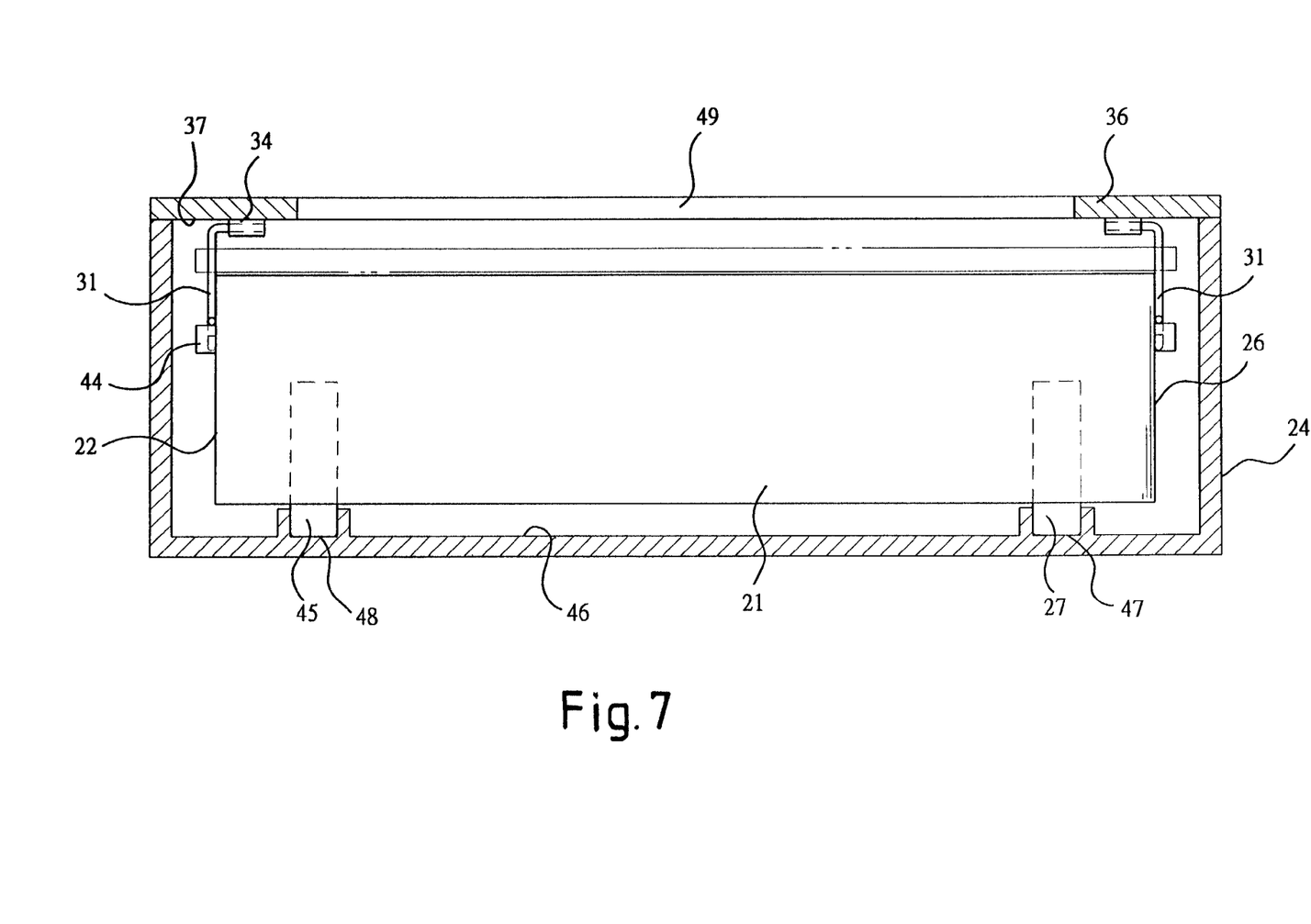
FIG. 7 is a schematic front view of another embodiment of the invention.

Except for the second end 26 of the chassis 21 being provided with an elastic locking bar 31, the first end 22 of the chassis 21 may have the same structure design. Referring to FIGS. 6 and 7, the first end 22 of the chassis 21 is provided with a protruding shaft 44. The concave (not shown) of the middle of the elastic locking bar 31 is mounted on the protruding shaft 44. The end of the elastic locking bar 31 is provided with a roller 34 which is rested on the inner layer surface 37 of the top cover 36. The lower portion of the chassis 21 is provided with two rollers 27 and 45. The bottom face 46 of the bottom housing 24 is provided with channels 47 and 48. The two rollers 27 and 45 respectively mate with the channels 47 and 48. Thus, the first end 22 and second end 26 of the chassis 21 are both provided with an elastic locking rod 31, such that the chassis 21 obtains a rigid assembly effect in the upward and downward directions. In the sideward direction, the two rollers 27 and 45 respectively mate with the channels 47 and 48, so that the chassis 21 will not displace sideward.

Thus, under the use condition of a general horizontal placement, the contact member 33 mounted on the elastic locking bar 31 is smoothly rested on the inner layer surface 37 of the glass 49 or the top cover 36 to move. The elastic locking bar 31 is pressed on the end of the chassis 21, so that the chassis 21 can move stably. When the scanner is used in a non-horizontal manner, the elastic locking bar 31 is also pressed on the end of the chassis 21, and the contact member 33 mounted on the elastic locking bar 31 is still smoothly rested on the inner layer surface 37 of the glass 49 or the top cover 36 to move, so that the chassis 21 can move stably, without deflecting or wobbling. Even when the scanner is rotated through 180 degrees, one end of the chassis 21 is pressed by the elastic locking bar 31, and the own weight of the chassis 21 will not cause it to deflect or wobble.

Figure 8:
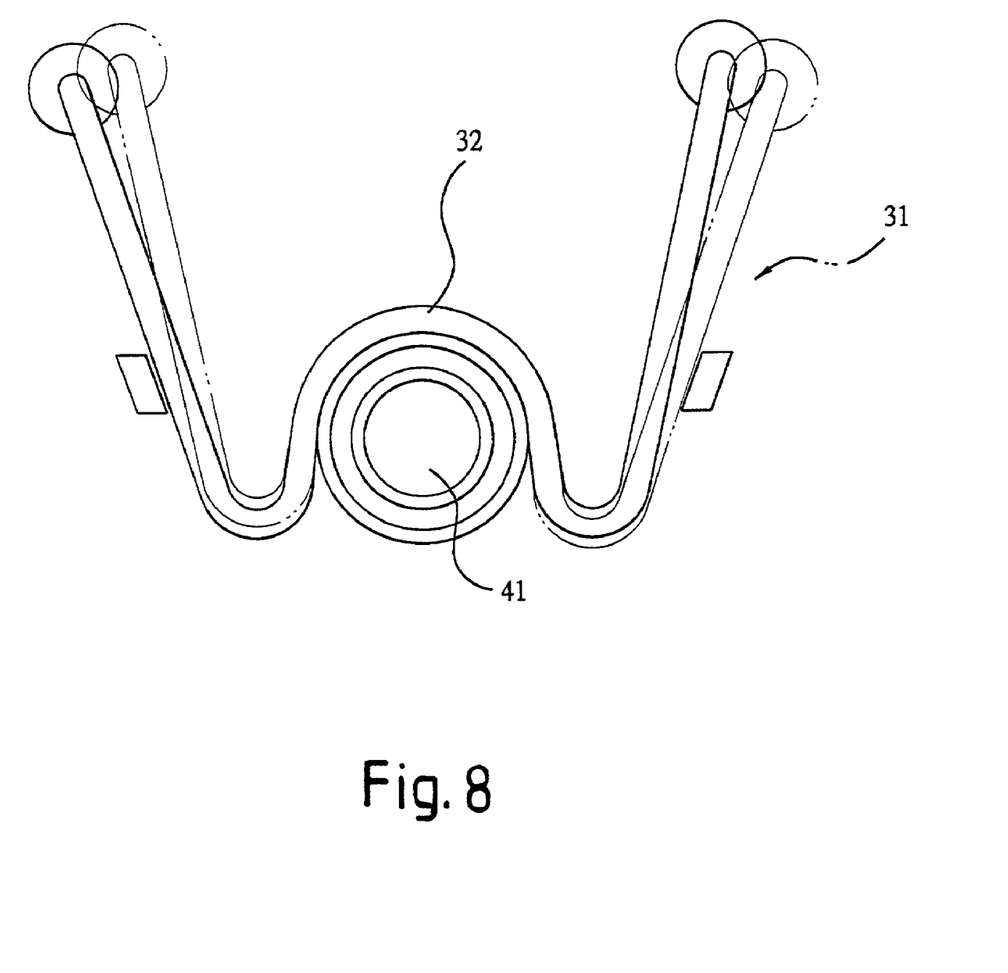
FIG. 8 is a schematic view of a swinging state of the elastic locking bar of the invention.

In addition, a tolerance will be produced during fabrication of the top cover 36 and the bottom housing 24. When the top cover 36 is mounted on the bottom housing 24, each position cannot be located on the same horizontal state. These tolerance values will easily affect the optical travel path, so that the scanning effect is poor. Referring to FIG. 8, the concave 32 of the middle of the elastic locking bar 31 is rested on the protruding shaft 41. The elastic locking bar 31 may perform a swing movement. Thus, when a tolerance is produced during fabrication and assembly of the top cover and the bottom housing (both not shown), the elastic locking bar 31 can absorb the tolerance of fabrication and assembly of the top cover and the bottom housing by the expanding angle of the two sides and the whole deflecting rotation. Thus, when the chassis 21 is moved, it may have a stable optical travel path.

Accordingly, in the invention, the chassis is provided with at least one swingable elastic locking bar, and the ends of the elastic locking member is provided with a contact member having a low friction coefficient to contact the top cover.

While the preferred embodiment of the invention has been shown and described, it will be apparent to those skilled in the art that various modifications may be made in the embodiment without departing from the spirit of the invention. Such modifications are all within the scope of the invention.

What is claimed is:

1. A CCD scanner for scanning at an arbitrary angle, comprising:
    a frame body consisting of a top cover and a bottom housing, and the top cover being provided with a glass;
    a chassis mounted in the frame body and covered by the top cover; and
    at least one elastic locking bar swingably mounted on the chassis, the at least one elastic locking bar being formed with two ends on which contact members are mounted, and the contact members being in contact with the top cover of the frame body.

2. The CCD scanner for scanning at an arbitrary angle in accordance with claim 1, wherein the elastic locking bar is mounted on an end face of the chassis.

3. The CCD scanner for scanning at an arbitrary angle in accordance with claim 1, wherein each of the contact members mounted on the elastic locking bar is a roller.

4. The CCD scanner for scanning at an arbitrary angle in accordance with claim 1, wherein each of the contact members mounted on the elastic locking bar is made of teflon.

5. The CCD scanner for scanning at an arbitrary angle in accordance with claim 1, wherein each of the contact members mounted on the elastic locking bar is in contact with an inner layer surface of the top cover.

6. The CCD scanner for scanning of an arbitrary angle in accordance with claim 1, wherein each of the contact members mounted on the elastic locking bar is in contact with an inner layer surface of the glass mounted on the top cover.

7. The CCD scanner for scanning of an arbitrary angle in accordance with claim 1, wherein the chassis is provided with a protruding shaft for mounting of the elastic locking bar.

8. The CCD scanner for scanning of an arbitrary angle in accordance with claim 1, wherein the chassis is provided with catch blocks mounted on outer sides of the elastic locking bar.

9. The CCD scanner for scanning of an arbitrary angle in accordance with claim 1, wherein the chassis is provided with at least one roller, and the roller is in contact with the bottom face of the bottom housing of the frame body.

10. The CCD scanner for scanning of an arbitrary angle in accordance with claim 9, wherein the bottom face of the bottom housing of the frame body is provided with a channel in order to function as a guide track during movement of the roller mounted on the chassis.

11. The CCD scanner for scanning of an arbitrary angle in accordance with claim 9, wherein the bottom face of the bottom housing of the scanner is provided with a protruding track for supporting the roller mounted on the chassis, and functions as a guide track during movement of the roller.

* * * * *